Feb. 27, 1923.
L. E. TRIMM.
AUTOMOBILE WHEEL LOCK.
FILED AUG. 12, 1920.
1,447,053.
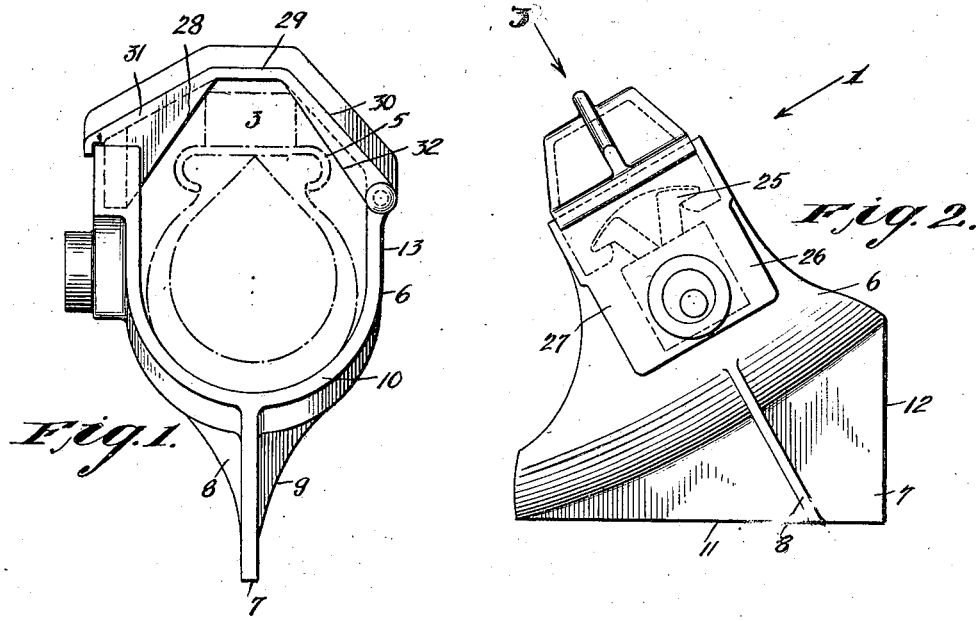
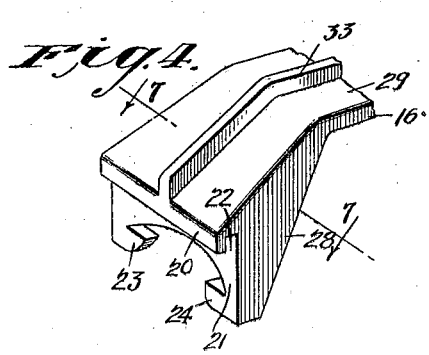
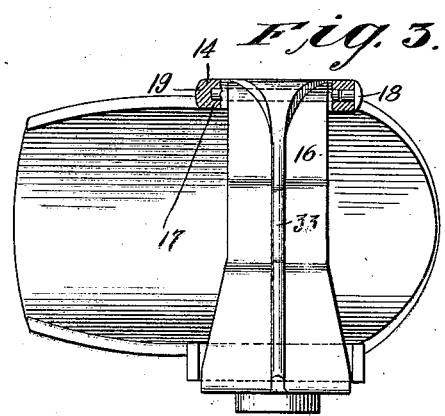
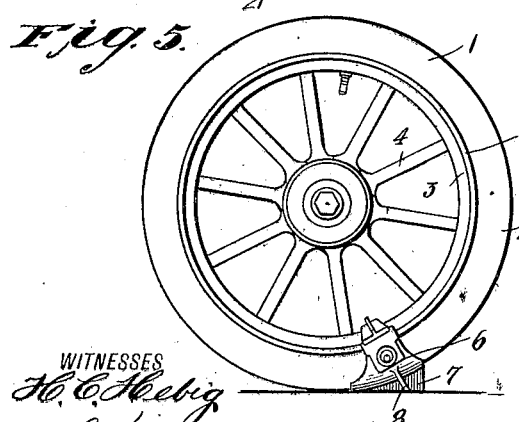
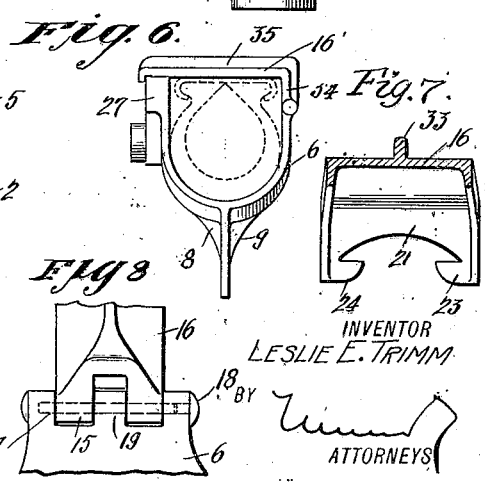
WITNESSES
H. C. Hebig
A. L. Kitchin
INVENTOR
LESLIE E. TRIMM
BY
ATTORNEYS Patented Feb. 27, 1923.

1,447,053

UNITED STATES PATENT OFFICE.

LESLIE ELMER TRIMM, OF BROOKLYN, NEW YORK.

AUTOMOBILE WHEEL LOCK.

Application filed August 12, 1920. Serial No. 402,965.

*To all whom it may concern:*

Be it known that I, LESLIE E. TRIMM, a citizen of the United States, and a resident of the city of New York, borough of Brooklyn, in the county of Kings and State of New York, have invented a new and Improved Automobile Wheel Lock, of which the following is a full, clear, and exact description.

This invention relates to locks for the wheels of automobiles, and has for an object to provide an improved construction which is easily applied and removed and which will effectively resist unauthorized removal.

Another object of the invention is to provide a lock for automobile wheels in the nature of a chock which is so formed as to prevent any one from rotating the same after it has been applied.

A still further object is to provide a lock for automobile wheels in which means are provided for snugly fitting the tire and also the rim and a bracing fender is presented having two faces designed to engage flatwise the ground when the device is in use.

In the accompanying drawing:

Figure 1 is a front view of a lock disclosing an embodiment of the invention.

Figure 2 is a side view of the lock shown in Figure 1.

Figure 3 is a top plan view of the lock shown in Figure 2.

Figure 4 is a detail fragmentary perspective view showing one end of the locking arm embodying certain features of the invention.

Figure 5 is a side view of an automobile wheel with a lock embodying the invention shown applied thereto.

Figure 6 is a view similar to Figure 1, but showing a modified arrangement of locking arm for use on wire spoked wheels.

Figure 7 is a sectional view through Figure 4 on line 7—7.

Figure 8 is a fragmentary side view showing a knuckle or hinge structure embodying certain features of the invention.

Referring to the accompanying drawing by numerals, 1 indicates a wheel of an automobile provided with an ordinary pneumatic tire 2 and formed with a wood felly 3 for receiving the spokes 4. The tire 2 is held in place by any usual or preferred rim 5. A lock or chock block 6 embodying the invention is shown applied to the wheel and is formed so as to snugly fit part of the tire 2 and against the felly 3 so that it cannot be rotated independently in a plane positioned transversely of the tire. The lock 6 may rotate with the wheel, but will strike the ground on each rotation and the fin 7 and the webs 8 and 9 will dig into the ground where it is soft and will raise the wheel where the ground is hard, so that progress would be difficult except for a very short distance at a very low speed.

In Figures 1 to 4 inclusive will be seen the detail construction of the block 6 to which reference is now made. It will be noted that the block 6 is provided with a body 10 formed arc-shaped circumferentially so as to fit the tire 2 and also arc-shaped for part of the distance transversely. The fin 7 radiates from the center of the body 10 as shown in Figure 1 and is braced properly by the webs 8 and 9. From Figure 2 it will be noted that the fin 7 is provided with a straight flat contact surface 11 which normally rests on the ground when the device is in use, as shown in Figure 5, and is arranged at right angles to the surface 12.

The body 6 merges at one side into a straight section 13, which in turn merges into a number of knuckles 14 which co-acts with the various knuckles 15 on the locking arm 16. The pintle pin 17 extends through all of these knuckles except one of the end knuckles 14 as indicated in Figure 3, said end knuckle being closed while the opposite end knuckle is open and supplied with a false head 18. In assembling the parts the knuckles are interlocked and then the pin 17 inserted in the knuckle having an aperture extending entirely therethrough and the pin is moved until it engages the bottom of the aperture having the closed end after which the false head 18 is forced into place and held therein preferably by friction. By this construction and arrangement the pin 17 cannot be forced out of the knuckles or even removed by an authorized person unless the authorized person bores a hole at point 19 in the closed knuckle.

The arm 16 at the end opposite the knuckle 15 is provided with an overhanging flange 20 and a depending section 21 whereby a groove 22 is presented. The depending section 21 is formed into hooks 23 and 24 adapted to co-act with the locking bolts 25 of the locking member 26. The locking member 26 may be of any desired or preferred form of locking device provided it is formed with bolts 25 which may be caused to interlock and become disengaged from the hooks 23 and 24. The locking mechanism of the locking member 26 is arranged in casing 27 preferably formed integral with the body 6, said casing being open at the top for the entrance of the section 21 carrying the hooks 23 and 24 and also provided with suitable openings for the side flanges 28. It will be noted that the arm 16 is provided with a central flat section 29 merging into inclined sections 30 and 31, said inclined sections being provided with flanges 28 and 32 respectively which may press against the felly 3 of the wheel 1 and also under some circumstances against the rim 5. The arm 16 is provided with a flange 28 and also a flange 32 on each edge whereby the arm is braced thoroughly and acts with the body 6 to prevent the device from being rotated around the tire. It will also be noted that a central web 33 is provided on the arm for presenting additional stiffening and strengthening means. As shown in Figures 1 and 2 the overhanging flange 20 acts as means for preventing an unauthorized person from forcing an implement into the slot in which the section 21 extends.

In Figure 6 will be seen a slightly modified form of the invention in which the arm 16' is provided with a straight section 34 acting as an elongation of one side of the body 6 and a transverse straight section 35 fitting flatwise against the flat felly of a wheel. The casing 27 in this form of the invention is preferably extended upwardly a short distance to meet the arm 35. It will be noted that the same inventive idea is present in this construction but the parts are formed in a modified way to accommodate the device to wire wheels or any wheels having a flat rim.

What I claim is:

A wheel lock of the character described comprising a body having outwardly projecting, longitudinal and transverse fins, the longitudinal fin being wedge-shaped, and presenting an even pavement engaging edge extending the entire length of the body, the transverse fins being substantially triangular-shaped, and merging into the body, and the longitudinal fin to reinforce the latter, a yoke pivoted to one side of said body, said yoke presenting at its inner surface a pair of obliquely disposed flanges adapted to engage the felly of a wheel, the free end of said yoke presenting laterally disposed locking members, and lock mechanism integral with the other side of said body, and adapted to engage said lateral locking members of said yoke.

LESLIE ELMER TRIMM.